UNITED STATES PATENT OFFICE.

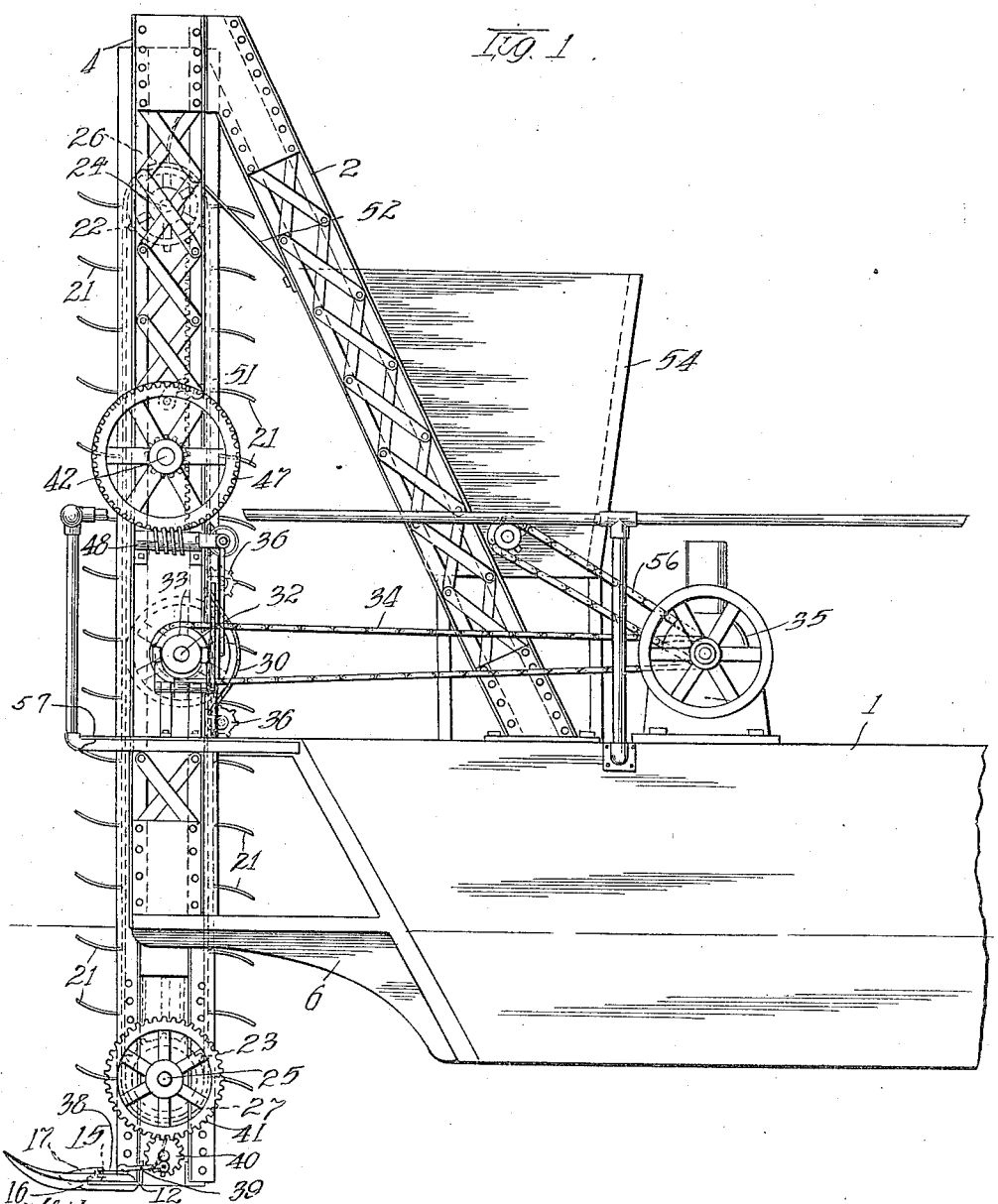

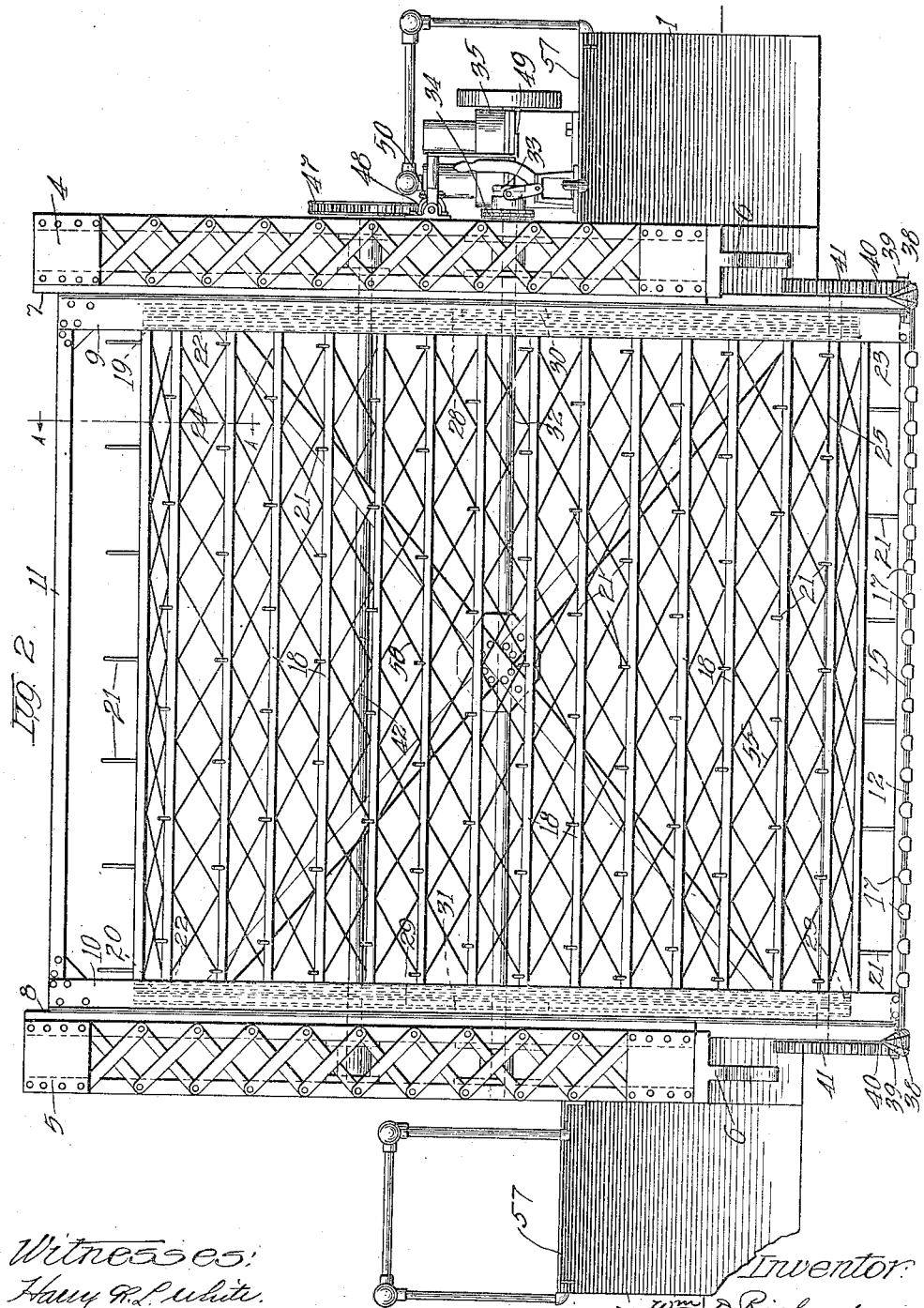

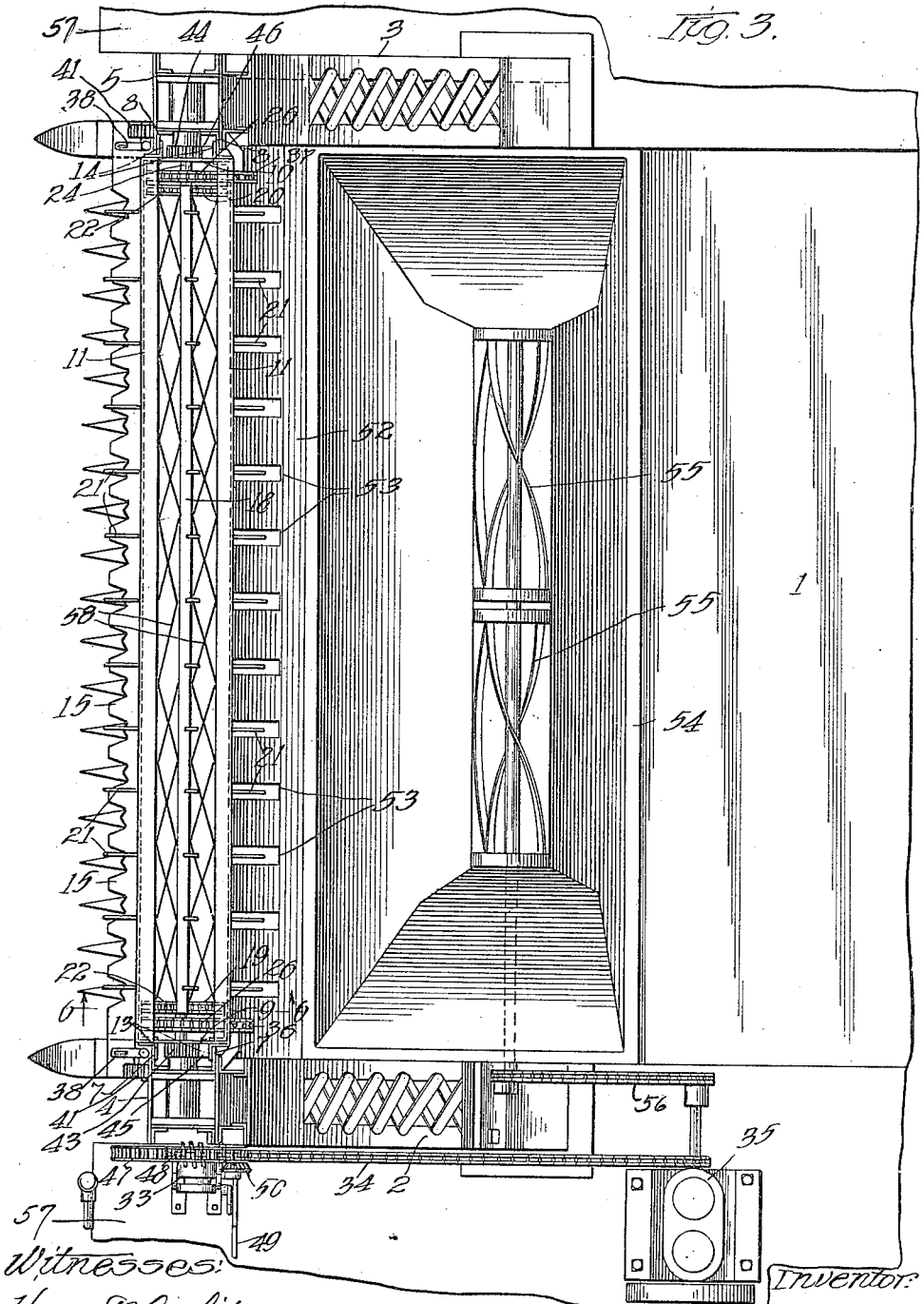

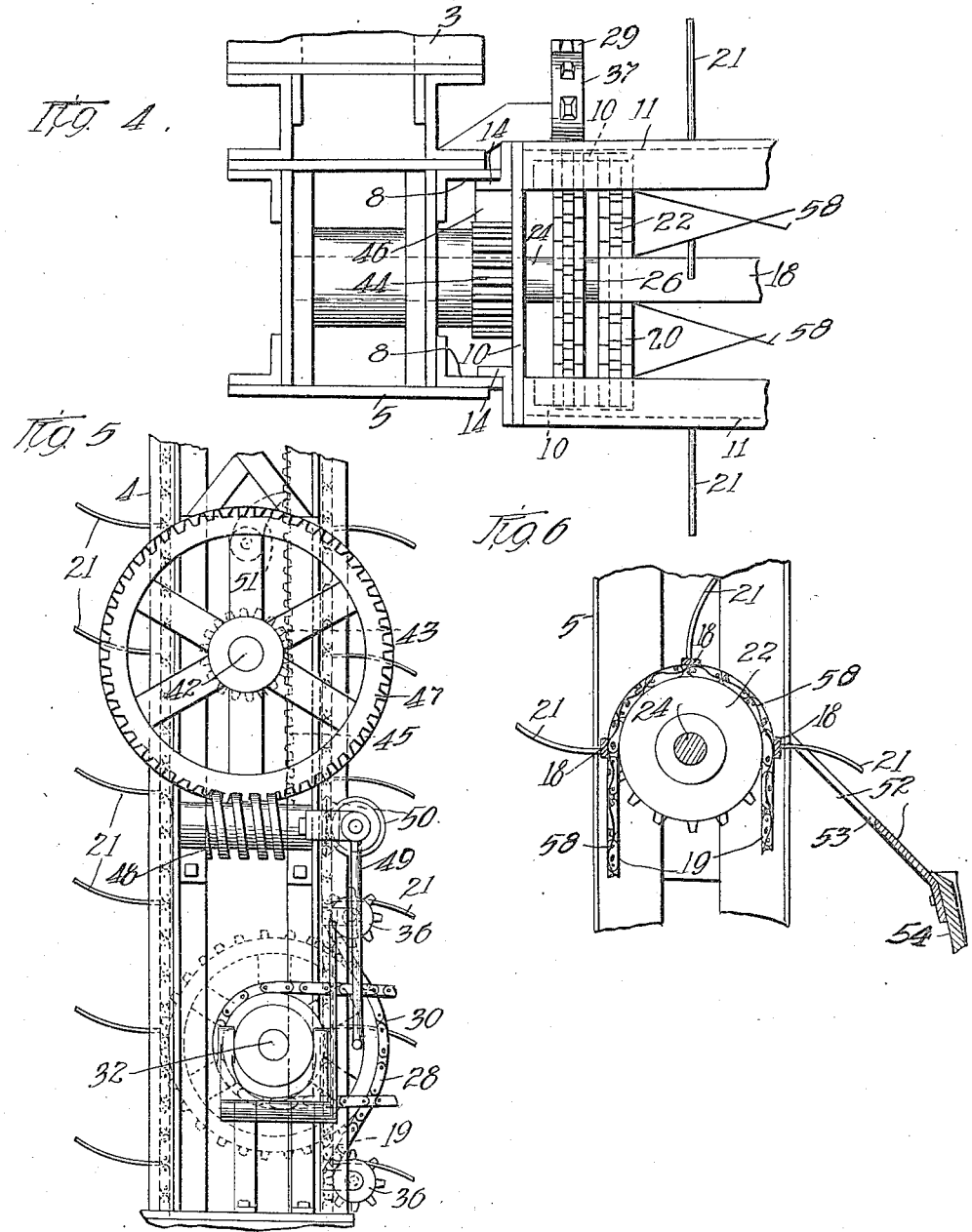

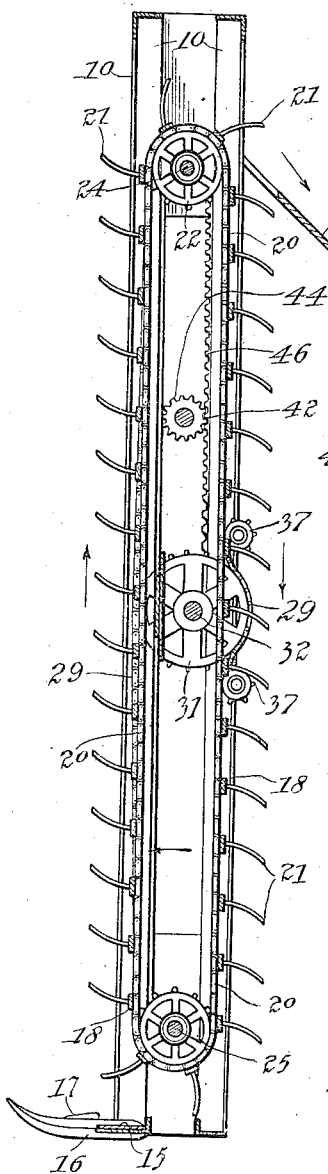
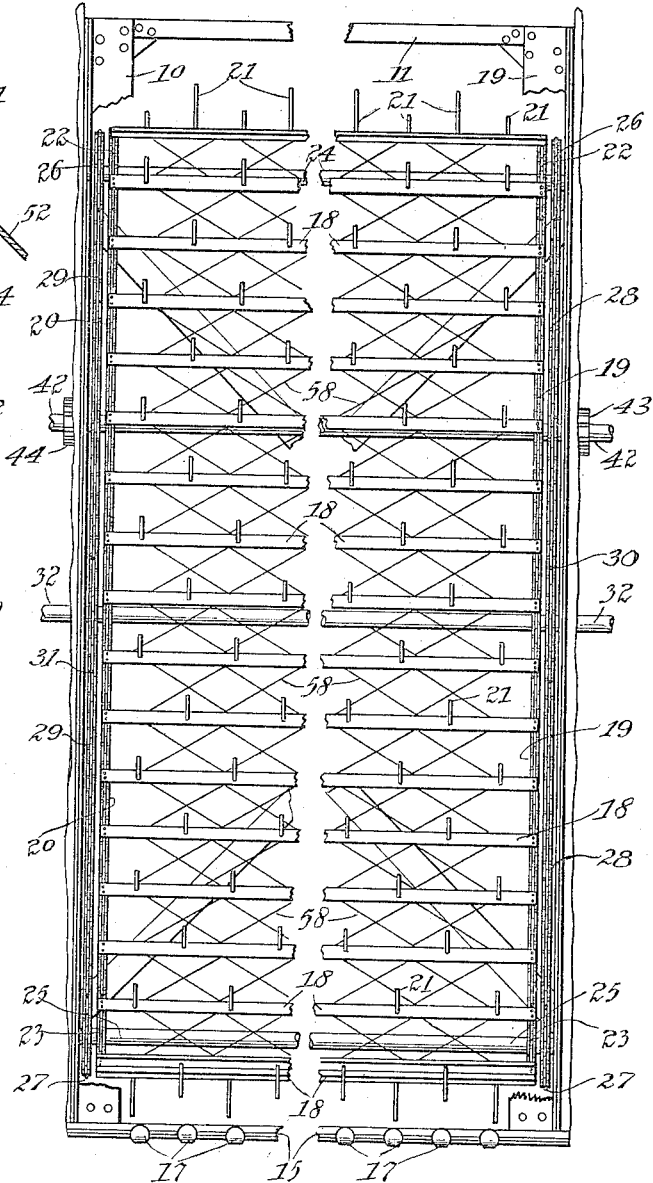

WILLIAM D. RICHARDSON, OF CHICAGO, ILLINOIS, ASSIGNOR TO SWIFT AND COMPANY, OF CHICAGO, ILLINOIS, A CORPORATION OF ILLINOIS.

KELP-HARVESTER.

1,222,324. Specification of Letters Patent. Patented Apr. 10, 1917.

Application filed December 3, 1915. Serial No. 64,798.

*To all whom it may concern:*

Be it known that I, WILLIAM D. RICHARDSON, a citizen of the United States of America, and a resident of Chicago, county of Cook, and State of Illinois, have invented certain new and useful Improvements in Kelp-Harvesters, of which the following is a specification.

The main objects of this invention are to provide an improved form of marine harvesting machine particularly adapted for use in the harvesting of kelp and similar material; to provide such a harvesting machine that will occupy a minimum amount of space on the barge or float upon which it is mounted, thereby leaving a maximum amount of space for storage of the harvested material; and to provide an improved form of mounting for the conveyer whereby the harvested material is at all times conveyed to and discharged at the same place, regardless of the elevation of the cutter.

An illustrative embodiment of this invention is shown in the accompanying drawings, in which—

Figure 1 is a side elevation of a harvesting machine mounted on a barge.

Fig. 2 is a front elevation of the same.

Fig. 3 is a top plan of the machine.

Fig. 4 is an enlarged fragmentary detail showing the guideways in which the conveyer is vertically slidable.

Fig. 5 is an enlarged view of the mechanism for raising and lowering the conveyer.

Fig. 6 is a fragmentary section on the line A—A of Fig. 2.

Fig. 7 is a central transverse vertical section of the conveyer and framework.

Fig. 8 is a front elevation of the conveyer with the center broken away and with the front flanges of the side angle bars broken away to show the conveyer chains and the driving chains.

In the construction shown in the drawings a barge or float 1 is equipped with a supporting frame-work, comprising slanting brace members 2 and 3 having their lower ends secured to the deck of the barge, and their upper ends fastened to the tops of vertically disposed posts or members 4 and 5 respectively. The lower ends of members 4 and 5 are supported on bracket arms 6, attached to the end of the barge 1. The entire supporting structure may be a suitable trussed steel framework, and the inside of the vertical members 4 and 5 may have angle irons attached thereto forming guideways 7 and 8.

A conveyer having a rectangular framework formed by side members 9 and 10 and top and bottom members 11 and 12 is vertically disposed between the supporting members 4 and 5. The conveyer framework has angle bars 13 and 14 attached to the sides 9 and 10 of the conveyer frame and adapted to slide in the guideways 7 and 8.

Means for cutting the material to be harvested are provided and comprise a cutter knife 15 journaled in a cutter bar 16 mounted on the bottom member 12 of the conveyer frame a short distance in front of the conveyer. The cutter knife is adapted to be reciprocated on the bar 16 and coöperates with a series of guard fingers 17 of usual construction.

The cut material is caught and lifted from the water by means of a conveyer belt formed by a series of horizontally disposed slats 18 mounted on endless chains 19 and 20, and provided with outwardly projecting arms or prongs 21 which are adapted to catch the cut material. The endless chains 19 and 20 are carried by sprocket wheels 22 and 23 mounted on shafts 24 and 25 respectively, which are journaled in the top and bottom parts of the conveyer frame.

Means for preventing the cut material from falling through the slat construction of the belt conveyer are provided and comprise a wire network 58 attached to the belt conveyer immediately under the outer side thereof.

Rotary motion may be imparted to the shafts 24 and 25 for driving the conveyer belt by means of sprocket wheels 26 and 27 mounted on said shafts between the conveyer belt and the side members 9 and 10, said sprocket wheels being adapted to carry and be driven by endless chains 28 and 29.

Chains 28 and 29 are in turn driven by sprocket wheels 30 and 31 keyed to a shaft 32 which is journaled in the vertical supporting frames 4 and 5, and which is driven through a clutch 33 by a sprocket chain 34 connected to a suitable source of power 35. The chains are held in contact with the sprocket wheels 30 and 31 by idlers 36 and 37 respectively, carried by brackets secured to the stationary supporting frames 4 and 5.

Means for reciprocating the cutter knife 15 are provided and comprise a bell crank 38 pivoted on the conveyer frame with one end of the bell crank attached to the knife and the other end attached to a pitman 39 mounted on and driven by a gear wheel 40. The gear 40 meshes with a gear 41 of relatively large size keyed to the end of the shaft 25 which carries the lower end of the conveyer belt.

The conveyer as a whole may be raised and lowered with respect to the supporting frame by means of a horizontally disposed shaft 42 journaled in the vertical supporting members 4 and 5 and provided with pinions 43 and 44 located so as to engage racks 45 and 46 respectively attached to the side members 9 and 10 of the conveyer frame. Shaft 42 may be rotated by a gear 47 keyed thereto and which meshes with a worm 48 mounted on supporting frame 4. The worm 48 is rotated by a crank 49 through a pair of bevel gears 50, one of said gears being attached to the crank and the other to the worm. A pawl or dog 51 may be pivoted to the supporting framework 4 in position to engage one of the racks for locking the conveyer frame against further downward movement and for relieving the strain on worm 48. While the sprockets 30, 31, and the idlers 36, 37, are within the inclosure of the conveyer frame, the bearings for the shaft 32, which carries the sprockets 30 and 31, and the brackets which carry the idlers 36 and 37, are secured to the outer stationary frames 4, 5, thereby permitting the raising and lowering of the conveyer frame without interfering with the drive through the chain 34 which remains at all times in the same position.

Means for receiving the material raised by the conveyer belt comprise a sloping grating or table 52 provided with slots 53 through which the arms 21 of the conveyer belt may pass. The receiving table is attached to the supporting members 2 and 3 and in position to cause the material deposited thereon to fall into a hopper 54 in which the material may be cut to relatively small pieces by knives 55 journaled in the bottom of said hopper. Rotary motion may be imparted to the cutter knives by suitable means 56 connected to the source of power 35.

In using a harvester of this kind it is advisable to have some one stationed where they can watch the cutting and ward off with a boat hook, or the like, sticks or other undesirable materials which may be floating in the path of the machine. For this purpose the barge 1 is provided with observation platforms 57 located at opposite sides of and projecting somewhat in front of the conveyer.

In the operation of the device, the conveyer frame may be lowered into the water by disengaging the pawl or dog 51 from the rack 45 and turning the crank handle 49, so as to rotate the shaft 42 carrying pinions 43 and 44 which mesh with the racks 45 and 46. When lowered to the desired depth the pawl 52 is shifted to again engage the rack 46. Operating power is supplied by the engine 35 having suitable connections for rotating the hopper knives 55 and sprocket chain 34. Rotation of the sprocket chain 34 drives the shaft 32 through clutch 33 when said clutch is in operative position, and thereby rotates the sprocket wheels 30 and 31. The chains 28 and 29, which connect the shafts 24 and 25, are driven by the sprockets 30 and 31, and are held in engagement therewith by the idlers 36 and 37. The cutter knife 15 is reciprocated by the bell crank 38 and pitman 39, carried on gear 40 which meshes with the gear 41 keyed to shaft 25.

With such arrangement the conveyer may be shifted vertically with respect to its supporting members without stopping the operation of the machine, and the conveyer will discharge in the same vertical plane at all times regardless of whether it is in a raised or lowered position, thereby not necessitating any shifting of the hopper or the employing of a second conveyer for carrying the harvested material to such hopper.

Although but one specific embodiment of this invention has been herein shown and described, it will be understood that numerous details of the construction shown may be altered or omitted without departing from the spirit of this invention as defined by the following claims.

I claim:—

1. A harvesting machine of the class described, comprising a float, a conveyer operatively secured in a vertical position relatively thereto and having a frame slidably mounted on said float, means for shifting the lower end of said conveyer frame to different elevations with respect to said float, said conveyer being mounted so as to discharge in the same vertical plane at all times, and means located adjacent the conveyer and operated from the float for cutting the material to be harvested.

2. A harvesting machine of the class described, comprising a float, a conveyer operatively secured in a vertical position relatively thereto and having a frame slidably mounted on said float, means for shifting the lower end of said conveyer frame to different elevations with respect to said float, said conveyer being mounted so as to discharge in the same vertical plane at all times, and means carried at the lower end of said conveyer for cutting the material to be harvested.

3. A harvesting machine of the class described, comprising a float, a conveyer operatively secured in a vertical position relatively to said float, means for cutting the material to be harvested, and means for moving said conveyer in a vertical plane relatively to said float.

4. A harvesting machine of the class described, comprising a float, a conveyer mounted on said float to move longitudinally in a vertical plane relatively thereto, and a cutter mounted on the lower end of said conveyer, said conveyer being mounted so as to discharge in the same vertical plane when in different positions with respect to its float.

5. A harvesting machine of the class described, comprising a float, a conveyer slidably mounted on said float, a cutter mounted on the lower end of said conveyer, and means for moving said conveyer in a vertical plane relatively to said float.

6. A harvesting machine of the class described, comprising a float, guideways on said float, a conveyer slidably mounted in said guideways, a cutter mounted at the lower end of said conveyer and slidable therewith, and means for shifting said conveyer in said guideways.

7. A harvesting machine of the class described, comprising a float, guideways on said float, a conveyer slidably mounted in said guideways, a cutter mounted at the lower end of said conveyer and slidable therewith, means for shifting said conveyer in said guideways, and means for locking said conveyer against movement relatively to said float.

8. A harvesting machine of the class described, comprising a float, a conveyer frame mounted on and movable relatively to said float, a belt conveyer on said frame, a cutter mounted on the lower end of said frame, and means for driving said conveyer, said frame being mounted so that said conveyer will discharge at the same vertical plane when said frame is in different positions with respect to said float.

9. A harvesting machine of the class described, comprising a float, a conveyer frame mounted on said float to move longitudinally in a vertical plane relatively thereto, a belt conveyer on said frame, means for driving said conveyer, a cutter mounted on the lower end of said frame, and connections between said cutter and conveyer driving means for operating said cutter.

10. A harvesting machine of the class described, comprising a float, a conveyer frame slidably mounted on said float to move longitudinally in a vertical plane relatively thereto, shafts journaled at opposite ends of said frame, a belt conveyer carried on said shafts, means for rotating said shafts for driving said conveyer, a cutter mounted on the lower end of said frame, and connections between said cutter and shaft rotating means for operating said cutter.

11. A harvesting machine of the class described, comprising a float, a conveyer frame slidably mounted on said float and movable in a vertical plane, shafts journaled at opposite ends of said frame, a conveyer carried by said shafts, a drive chain connecting said shafts, a drive wheel on said float for driving said chain, a cutter mounted on the lower end of said frame, and connections between said cutter and one of said shafts for operating said cutter.

Signed at Chicago this 27th day of November, 1915.

WILLIAM D. RICHARDSON.

Copies of this patent may be obtained for five cents each, by addressing the "Commissioner of Patents, Washington, D. C."